US010093263B2

(12) United States Patent
Jindal et al.

(10) Patent No.: US 10,093,263 B2
(45) Date of Patent: Oct. 9, 2018

(54) ENERGY ABSORBING INSTRUMENT PANEL COMPONENT

(71) Applicant: Ford Global Technologies, LLC, Dearborn, MI (US)

(72) Inventors: Pardeep Kumar Jindal, Canton, MI (US); Rahul Makwana, Dearborn Heights, MI (US); Matthew B. Makowski, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 77 days.

(21) Appl. No.: 14/800,986

(22) Filed: Jul. 16, 2015

(65) Prior Publication Data

US 2017/0015358 A1 Jan. 19, 2017

(51) Int. Cl.
*B60R 21/045* (2006.01)

(52) U.S. Cl.
CPC .................................. *B60R 21/045* (2013.01)

(58) Field of Classification Search
CPC ............ B60R 21/02; B60R 2021/0206; B60R 2021/0226; B60R 2021/024; B60R 2021/0293; B60R 21/04; B60R 21/045; B60R 21/055
USPC .......................................... 296/153; 280/752
See application file for complete search history.

(56) References Cited

U.S. PATENT DOCUMENTS 3,400,979 A * 9/1968 James ...................... A47C 7/54 267/95
4,786,100 A * 11/1988 Kleemann ................ B60J 5/045 267/153
5,857,702 A * 1/1999 Suga ...................... B60J 5/0451 188/377
6,568,743 B1 * 5/2003 Jayasuriya ......... B60N 2/42727 296/153
7,201,434 B1 * 4/2007 Michalak ............... B60K 37/00 280/752
7,291,378 B2 * 11/2007 Cowelchuk ............... B32B 7/02 428/140
7,484,792 B2 * 2/2009 Penner ...................... B60R 7/06 280/752
7,513,528 B2 4/2009 Penner
7,703,829 B2 * 4/2010 Miki ..................... B60R 21/045 280/748

(Continued)

FOREIGN PATENT DOCUMENTS

| | | |
|---|---|---|
| CN | 203047083 U | 7/2013 |
| EP | 1826070 A1 | 8/2007 |
| JP | H082333 A | 1/1996 |

OTHER PUBLICATIONS

On-line web dictionary definition of "adhere" from http://www.dictionary.com/browse/adhere, accessed Jun. 19, 2017.*

*Primary Examiner* — Hilary L Gutman
(74) *Attorney, Agent, or Firm* — Frank A. MacKenzie; Bejin Bieneman PLC

(57) ABSTRACT

An instrument panel component includes a wall, a first projection, and a second projection. The wall is configured to be supported by the instrument panel. The first and second projections are supported by the wall and extend in a common direction away from the wall. The length of the first projection is different than the length of the second projection and both projections are of a different material than the material of the wall.

18 Claims, 7 Drawing Sheets

(56) References Cited

U.S. PATENT DOCUMENTS

| | | | | |
|---|---|---|---|---|
| 7,810,869 | B2 * | 10/2010 | Taracko | B60R 7/06<br>296/187.05 |
| 7,828,388 | B2 * | 11/2010 | Thomas | B60N 2/4235<br>296/1.09 |
| 7,874,587 | B2 * | 1/2011 | Miki | B60R 7/06<br>280/752 |
| 8,267,428 | B2 * | 9/2012 | DePue | B60R 21/02<br>280/751 |
| 8,308,189 | B2 | 11/2012 | Matsushima et al. | |
| 8,434,810 | B2 * | 5/2013 | Masada | B60R 7/06<br>280/752 |
| 8,454,053 | B2 * | 6/2013 | Sun | B60R 21/0428<br>280/751 |
| 9,604,589 | B1 * | 3/2017 | Vo | B60R 21/045 |
| 2004/0041385 | A1 * | 3/2004 | Garnweidner | B60R 21/045<br>280/752 |
| 2004/0124623 | A1 * | 7/2004 | Yamazaki | B60R 21/045<br>280/752 |
| 2005/0194773 | A1 * | 9/2005 | Yamada | B60R 21/045<br>280/752 |
| 2006/0038390 | A1 * | 2/2006 | Cho | B60R 21/045<br>280/752 |
| 2006/0232055 | A1 * | 10/2006 | Cappabianca | B60R 21/045<br>280/752 |
| 2013/0193698 | A1 * | 8/2013 | Nagwanshi | B60R 19/18<br>293/120 |
| 2015/0115640 | A1 * | 4/2015 | Jaschke | B62D 29/002<br>296/29 |
| 2015/0367798 | A1 * | 12/2015 | Bobba | B60R 19/56<br>293/120 |

* cited by examiner

ENERGY ABSORBING INSTRUMENT PANEL COMPONENT

BACKGROUND

An interior of a vehicle, such as an automobile, may include an instrument panel assembly. The instrument panel assembly may include components such as a glove box, knee bolster, etc. During a front end impact of the vehicle, an occupant of the vehicle may move forward and may impact one or more components of the instrument panel assembly, e.g., the glove box, knee bolster, etc. Vehicles may be scored by a variety standardized impact tests from organizations such as the National Highway Transportation and Safety Administration (NHTSA). For example, femur load capacity and body displacement during collision may be tested. The components of the instrument panel assembly, e.g., the glove box, knee bolster, etc., may be designed to absorb energy from the occupant during the impact.

Vehicle occupants vary in size and the varying size affects the magnitude of impact force of the occupant against the component, e.g., the glove box, knee bolster, etc., during an impact. Standardized tests may, for example, test impact against the component, e.g., the glove box, knee bolster, etc., from an occupant of the size of a 95% male occupant, i.e., a relatively large occupant, and may also test impact against the component from an occupant of the size of a 5% female occupant, i.e., a relatively small occupant. This difference in the size of the occupant creates competing design factors that favor relatively stiff components, e.g., the glove box, knee bolster, etc., for absorbing energy from large occupants and favor relatively flexible components, e.g., the glove box, knee bolster, etc., for absorbing energy from small occupants. In other words, a stiff component may absorb energy from the large occupant without "bottoming out" on a frame of the instrument panel assembly, but may be too stiff to adequately absorb energy from a small occupant at the initial impact against the component. On the other hand, a flexible component may absorb energy from a small occupant beginning with initial impact against the component, but may not adequately absorb energy from a large occupant at the end of the impact event. Therefore, there remains an opportunity to design a component that may absorb energy from an occupants of varying size.

DETAILED DESCRIPTION

Figure 1:
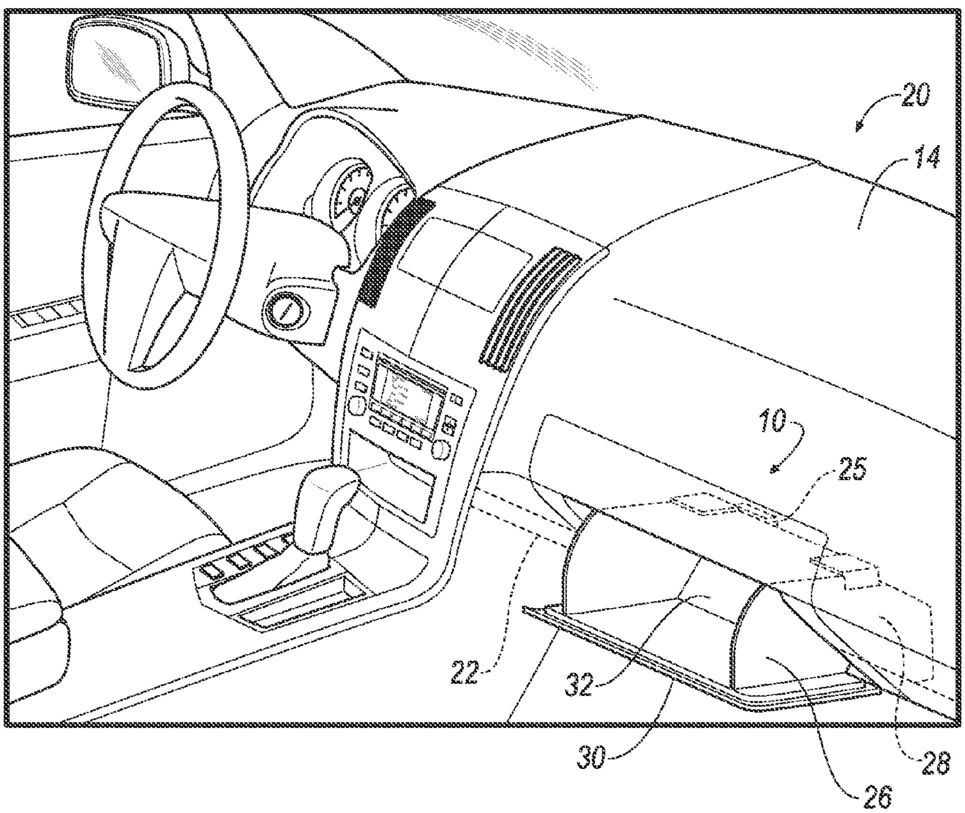
FIG. 1 is a perspective view of a glove box in a vehicle.
Figure 2:
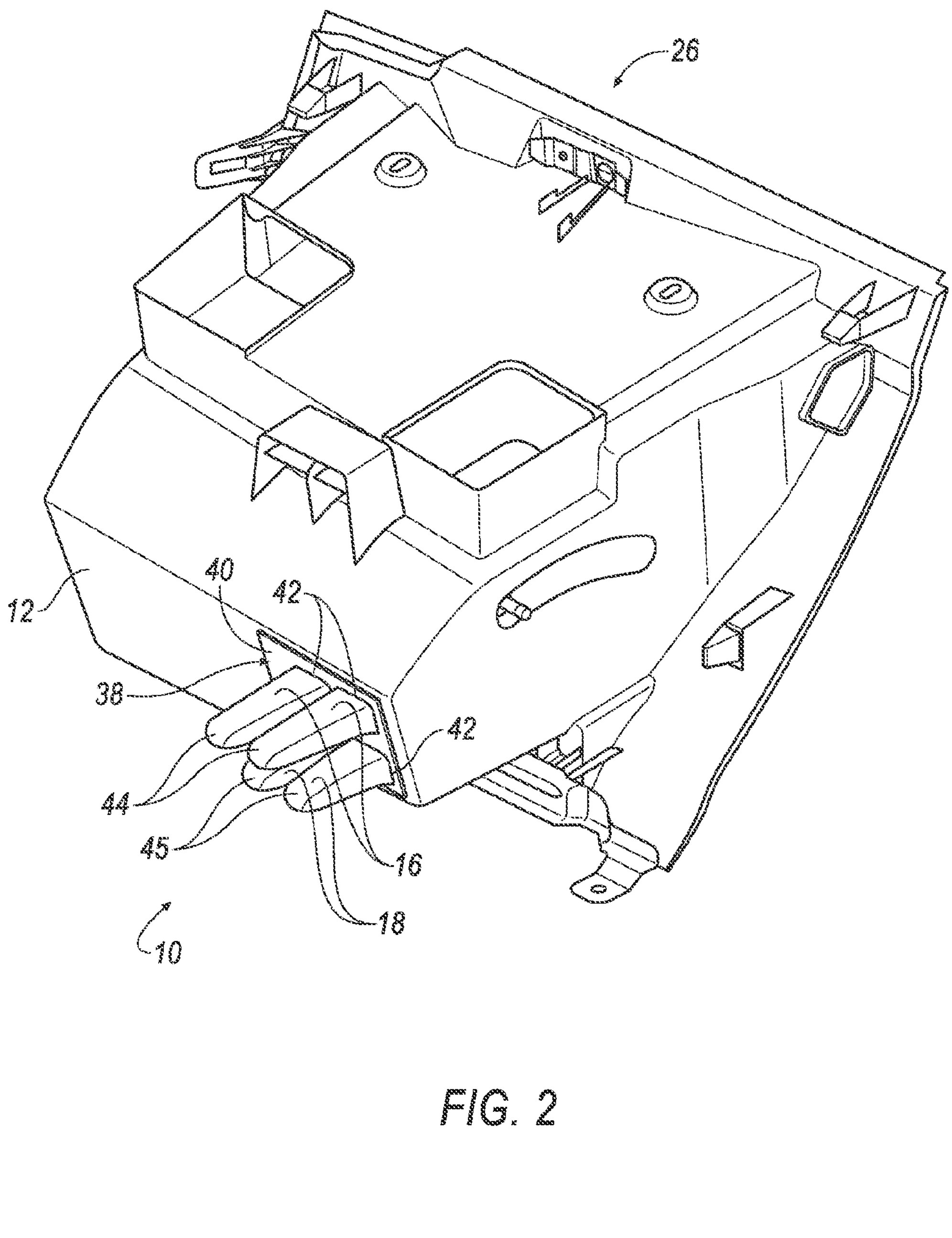
FIG. 2 is a rear perspective view of the glove box including an energy absorbing element having a base supported by a wall of the glove box and a plurality of projections extending from the base.

With reference to the Figures, wherein like numerals indicate like parts throughout the several views, the Figures show an energy absorbing element 10, 210, 310 for an instrument panel 14. The energy absorbing element includes a wall 12 that is configured to be supported by the instrument panel 14. The energy absorbing element 10, 210, 310 includes a first projection 16, i.e., a first rib, and a second projection 18, i.e., a second rib, each both supported by the wall 12 and extending in a common direction away from the wall 12. The first projection 16 has a first length and the second projection 18 has a second length different than the first length. The first projection 16 and the second projection 18 are of a different material than a material of the wall 12.

Figure 5:
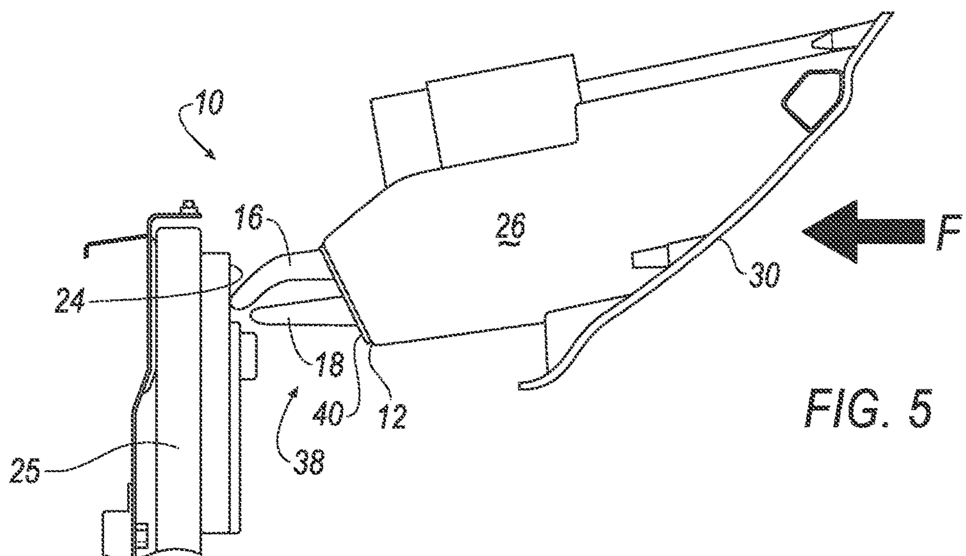
FIG. 5 is a side view of the glove box with a first projection of the energy absorbing element impacting the instrument panel during impact against the glove box by a relatively small occupant.
Figure 6:
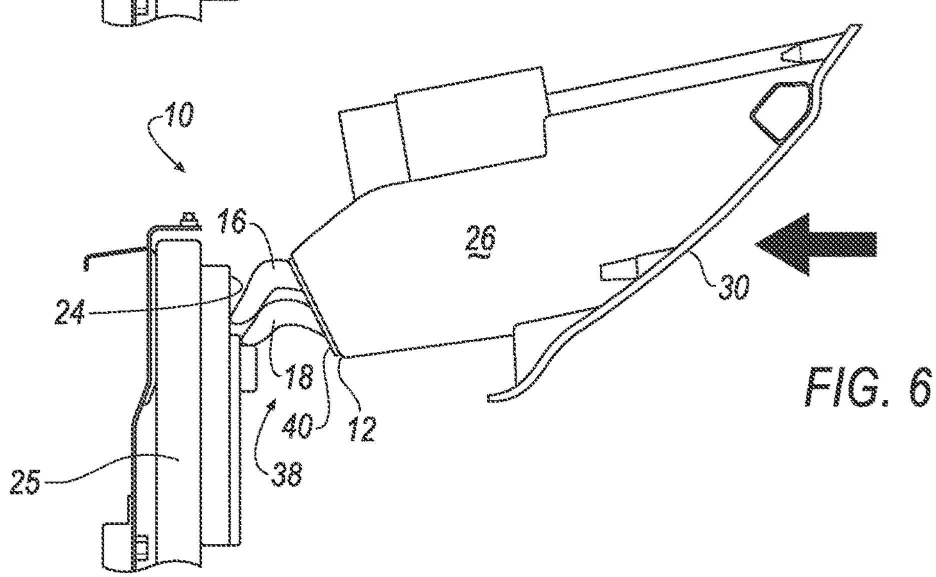
FIG. 6 is a left side view of the glove box with a first projection and a second projection of the energy absorbing element impacting the instrument panel during impact against the glove box by a relatively large occupant.

During an impact of the vehicle, e.g., a front end impact, an occupant of the vehicle may move toward the energy absorbing element 10, 210, 310 and impact the energy absorbing element 10, 210, 310. For example, the legs and/or knees of the occupant may impact the energy absorbing element 10, 210, 310. Because the first length of the first projection 16 is different than the second length of the second projection 18, the first projection 16 and the second projection 18 may, alone or in combination, absorb a range of impact forces from a variety of sized occupants. For example, as shown in FIG. 5, when a relatively small occupant, e.g., a $5^{th}$ percentile female occupant, strikes the energy absorbing element 10, 210, 310, the occupant deforms the first projection 16 and the first projection 16 absorbs energy from the occupant. In comparison, as shown in FIG. 6, when a relatively large occupant, e.g., a $95^{th}$ percentile male occupant, strikes the energy absorbing element 10, 210, 310, the occupant deforms both the first projection 16 and the second projection 18. In other words, in FIG. 5, the first projection 16 absorbs enough energy from the relatively small occupant that the second projection 18 is not needed to absorb energy. In FIG. 6, the relatively large occupant deforms the first projection 16 enough that the second projection 18 is needed to absorb energy in addition to the first projection 16, i.e., the first projection 16 and the second projection 18 act in parallel to absorb energy from the relatively large occupant. As such, the energy absorbing element 10, 210, 310 may absorb energy during impact from a relatively small occupant, a relatively large occupant, and occupants sized therebetween.

As set forth below, a first embodiment of the energy absorbing element 10 is shown in FIGS. 2-6, a second embodiment of the energy absorbing element 210 is shown, in part, in FIG. 7, and a third embodiment 310 is shown, in part, in FIG. 8.

The energy absorbing element 10, 210, 310 may be part of an instrument panel assembly 20, as shown in FIG. 1. The instrument panel assembly 20 may include an instrument panel 14. The instrument panel 14 may include a frame 22 and a covering. The frame 22 may be, for example, metal and/or plastic and may support the covering. The covering may be, for example, plastic, vinyl, leather, etc., and may provide an aesthetically pleasing appearance to the instrument panel assembly 20.

Figure 4:
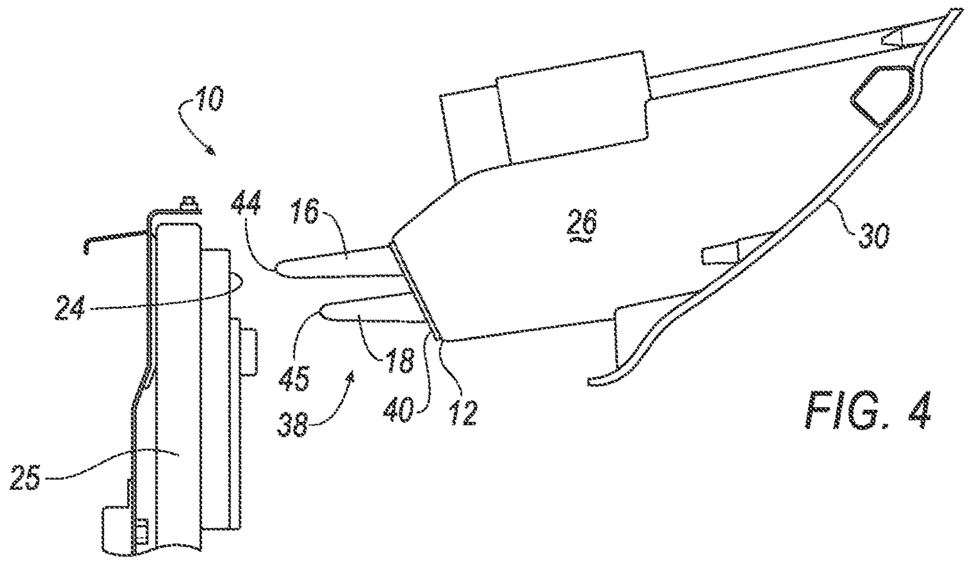
FIG. 4 is a left side view of the glove box prior to application of an impact force to the glove box.

The instrument panel 14 may include a reaction surface 24 for contacting the projections, as shown in FIGS. 4-6. For example, the reaction surface 24 may be defined by a module housing 25 of the instrument panel 14, as shown in FIGS. 4-6. Alternatively, the reaction surface 24 may be defined by any suitable surface of the instrument panel 14, including the frame 22. The reaction surface 24 is rigid relative to the first projection 16 and the second projection 18 such that the first projection 16 and the second projection 18 deform when forced against the reaction surface 24, as shown in FIGS. 5 and 6. The reaction surface 24 may have any suitable shape to contact the first projection 16 and the second projection 18 and/or to guide deformation of the first projection 16 and/or the second projection 18.

The energy absorbing element 10, 210, 310 may, for example, be a glove box 26, as shown in FIGS. 1-2 and FIGS. 4-6. In such a configuration, the glove box 26 may include a housing 28 and a cover 30 supported by the housing 28. The housing 28 may define a chamber 32 and the cover 30 may be moveably coupled to the housing 28 to cover and uncover the chamber 32, i.e., to open and close the glove box 26. The cover 30 may be configured to releasably lock in a closed position. To move between the closed position and an open position, the cover 30 may pivot about a hinge.

In the configuration in which the energy absorbing element 10, 210, 310 includes a glove box 26, the glove box 26 may present the wall 12 that supports the first projection 16 and the second projection 18. The wall 12 may, for example, be located at a rear end of the glove box 26, as shown in FIG. 2 and FIGS. 4-6. Regardless of the type of energy absorbing element 10, 210, 310, the wall 12, for example, may be formed of a polymer, e.g., plastic, or any other suitable material.

The glove box 26 may be moveable relative to the instrument panel 14 when subjected to a force exceeding a predetermined force. For example, the glove box 26 may be connected to the instrument panel 14 by break-away and/or deformable connection (not shown). Accordingly, if an occupant impacts the glove box 26 during an impact of the vehicle, e.g., a front end impact, the glove box 26 may move relative to the instrument panel 14 to allow the first projection 16 and the second projection 18 to move toward the reaction surface 24 of the instrument panel 14.

The cover 30 and/or the housing 28 may be rigid relative to the first projection 16 and the second projection 18 such that impact by an occupant against the glove box 26 is transferred through the glove box 26 to the first projection 16 and the second projection 18. The cover 30 and the glove box 26 may each be formed of any suitable type of material.

Figure 9:
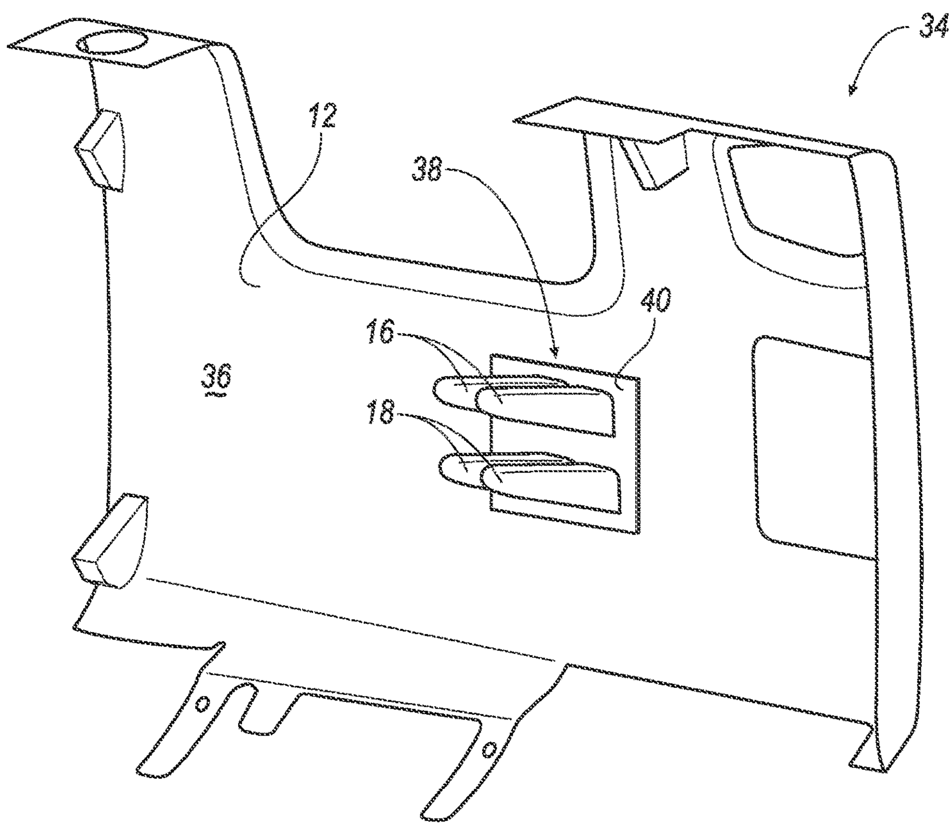
FIG. 9 is a perspective view of the energy absorbing element of FIG. 3 on a knee bolster.

As another example, as shown in FIG. 9, the energy absorbing element 10, 210, 310 may be a knee bolster 34. The knee bolster 34, for example, may include a substrate 36 and a covering. The substrate 36 may present the wall 12 that supports the first projection 16 and the second projection 18. The substrate 36 may, for example, be formed of plastic, and the covering may be formed of plastic, vinyl, leather, etc., and may provide an aesthetically pleasing appearance to the knee bolster 34. The knee bolster 34 may be located along any portion of the instrument panel 14.

Figure 3:
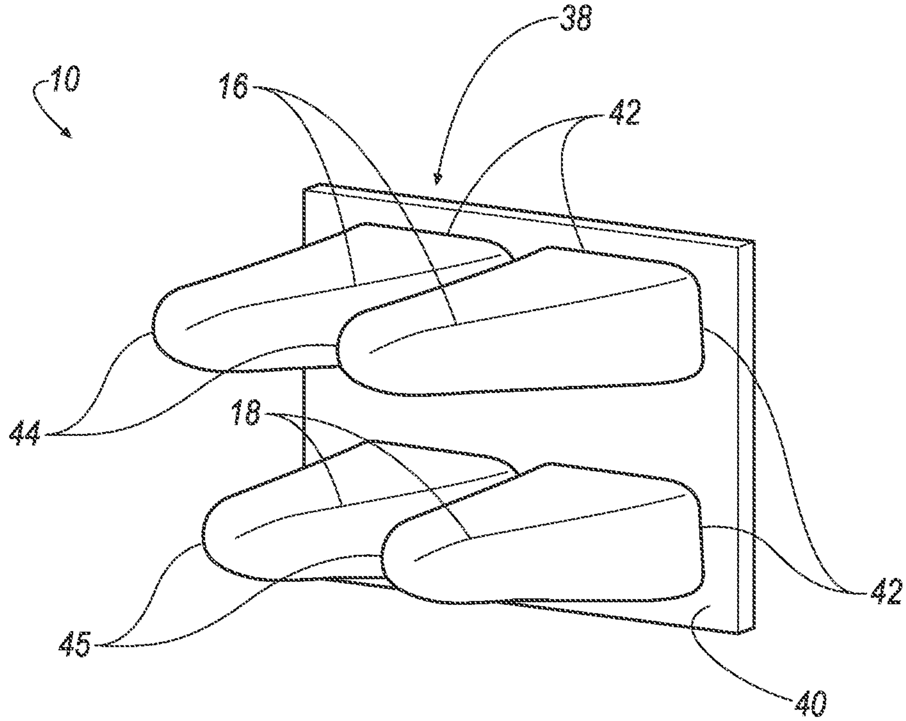
FIG. 3 is a perspective view of the energy absorbing element.

With reference to FIG. 3, the energy absorbing element 10, 210, 310, i.e., a patch, may include a base 40 with the first projection 16 and the second projection 18 supported by the base 40. The base 40 may be fixed relative to the wall 12, as set forth further below, to fix the first projection 16 and the second projection 18 to the wall 12.

The energy absorbing element 10, 210, 310 may include more than one first projection 16 and more than one second projection 18. For example, as shown in FIG. 3, the energy absorbing element 10, 210, 310 includes two first projections 16 and two second projections 18. Alternatively, the energy absorbing element 10, 210, 310 may include any suitable number, e.g., one or more, first projections 16 and may include any suitable number, e.g., one or more, second projections 18.

The first projection 16 and the second projection 18 may be integrally formed with the base 40, i.e., formed simultaneously as a single unit. Alternatively, the first projection 16 and/or the second projection 18 may be formed separately from the base 40 and subsequently attached to the base 40.

The base 40 may be adhered to the wall 12. For example, an adhesive or other bonding agent may adhere the base 40 to the wall 12. In addition, or in the alternative to adhesives, the base 40 may be mounted to the wall 12 by fastening (not shown), welding (not shown), or by any other suitable method.

With reference to FIGS. 2-6, the first projection 16 and the second projection 18 may be cantilevered from the base 40. For example, the first projection 16 and the second projection 18 each include a fixed end 42 fixed to the base 40 and a free end 44, 45 spaced from the base 40. As shown in FIGS. 5-6, the free end 44, 45 may contact the reaction surface 24 during impact of the energy absorbing element 10, 210, 310.

The first projection 16 and the second projection 18 may be formed of any suitable material. For example, the first material and the second material may be formed of foam.

As set forth above, the first projection 16 may be formed of a material that is different than the material of the second projection 18, i.e., the material of the first projection 16 may be a different material type and/or different density than the material of the second projection 18. For example, the first projection 16 and the second projection 18 may be formed of a different type of foam. As another example, the first projection 16 and the second projection 18 may be formed of the same type of foam having different densities. In such an embodiment, the first projection 16 and the second projection 18 may be tuned to change the deformation and compressibility of the projections, i.e., to absorb different amounts of energy.

The base 40 may be formed of the same type of material as the first projection 16 and/or the second projection 18. In such an embodiment, the base 40, the first projection 16, and the second projection 18 may be integrally formed, as set forth above, e.g., by simultaneously molding. Alternatively, the base 40 may be formed of a different type of material than the first projection 16 and the second projection 18. In such an embodiment, the base 40 may be integrally formed with the first projection 16 and/or the second projection 18, as set forth above, e.g., by a two or three shot molding process. The base 40 may be made of any suitable material. For example, the base 40 may be made of any plastic, rubber, polyurethane, metal, etc.

The first projection 16 may have a different size and/or shape than the second projection 18. For example, as set forth above, the length of the first projection 16 may be greater than the length of the second projection 18. In other words, the free end 44 of the first projection 16 may be spaced further from the base 40 than the free end 45 of the second projection 18. The length of the first projection 16, for example, may be 75 mm-175 mm, and the length of the second projection 18, for example, may be 50 mm-125 mm. As another example, the first projection 16 may have a different cross-sectional size and/or shape than the cross-sectional size and/or shape of the second projection 18. The size and shape of the first projection 16 and the second projection 18 may be tuned to absorb a desired amount of energy from varying sized occupants. As another example, the first projection 16 and/or the second projection 18 may be hollow or solid.

As set forth above, the energy absorbing element 10, 210, 310 may be supported on the wall 12 of the energy absorbing element 10, 210, 310, e.g., the glove box 26 or the knee bolster 34. Alternatively, the energy absorbing element 10, 210, 310 may be supported on the reaction surface 24 of the instrument panel 14. In such an embodiment, the first projection 16 and the second projection 18 may extend away from the instrument panel 14 toward the wall 12 of the energy absorbing element 10, 210, 310, e.g., the glove box 26 or the knee bolster 34.

At rest, the first projection 16 and/or the second projection 18 may be spaced from or contact the reaction surface 24. For example, the free end 44 of the first projection 16 may be spaced 25 mm-75 mm, e.g., 50 mm, from the reaction surface 24.

As set forth above, the first projection 16 and the second projection 18 extend in a common direction away from the wall 12, i.e., extend generally in a direction away from the wall 12 toward the reaction surface 24. Specifically, the first projection 16 and the second projection 18 may extend in parallel or non-parallel.

FIGS. 4-6 show the operation of the energy absorbing element 10, 210, 310. As set forth above, FIG. 4 shows the energy absorbing element 10, 210, 310, in the absence of force applied to the glove box 26. FIG. 5 shows the glove box 26 moved relative to the frame 22 by impact from a relatively small occupant. The relatively small occupant applies a relatively small force F to the glove box 26. This relatively small force F is absorbed by the first projection 16 without deforming the second projection 18. FIG. 6 shows the glove box 26 moved relative to the frame 22 by impact from a relatively large occupant. The relatively large occupant applies a relatively large force F' to the glove box 26. This relatively large force F' moves the glove box 26 sufficiently to deform both the first projection 16 and the second projection 18.

Figure 7:
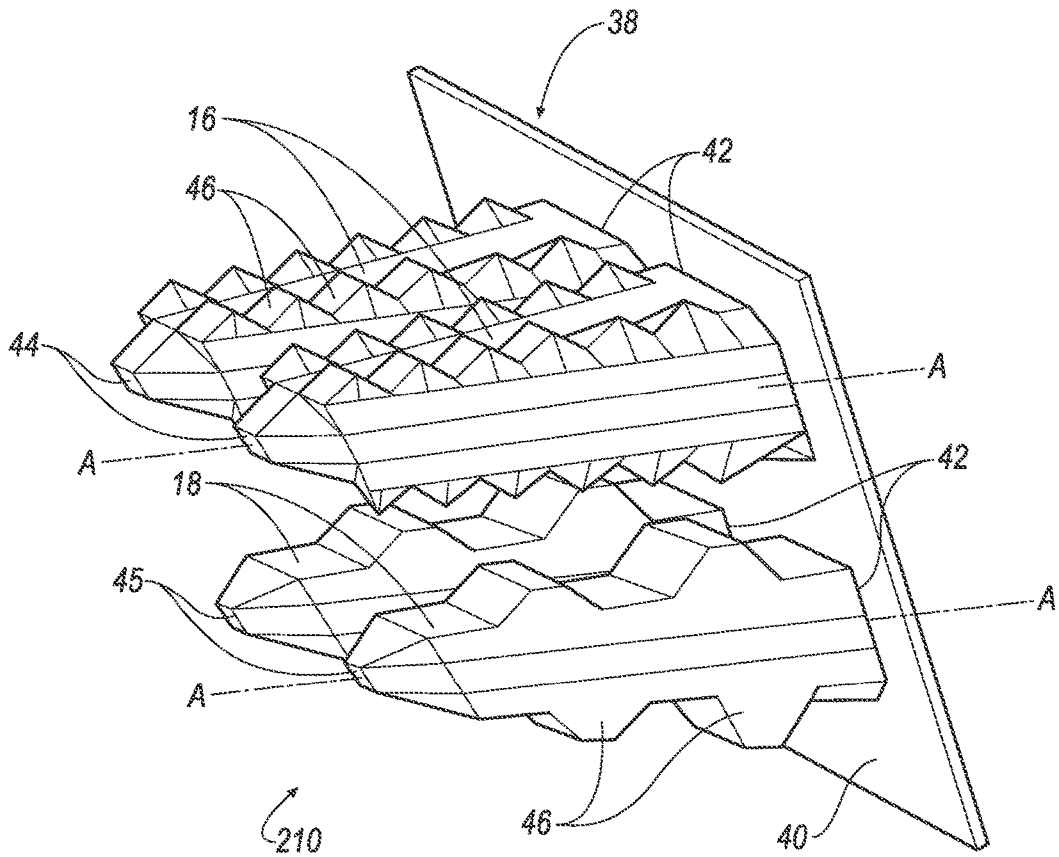
FIG. 7 is a perspective view of another embodiment of the energy absorbing element.

With reference to FIG. 7, in the second embodiment of the energy absorbing element 210, the first projection 16 and the second projection 18 extend along an axis A and include ribs 46 spaced from each other along the axis A. In this embodiment, as in FIG. 7, the ribs 46 are rounded and convex and form a central portion to define a zig-zag or a stepped pattern. The distance between each rib 46 may be spaced equally or unequally from one another along the axis A and arranged within a single plane or offset planes.

Figure 8:
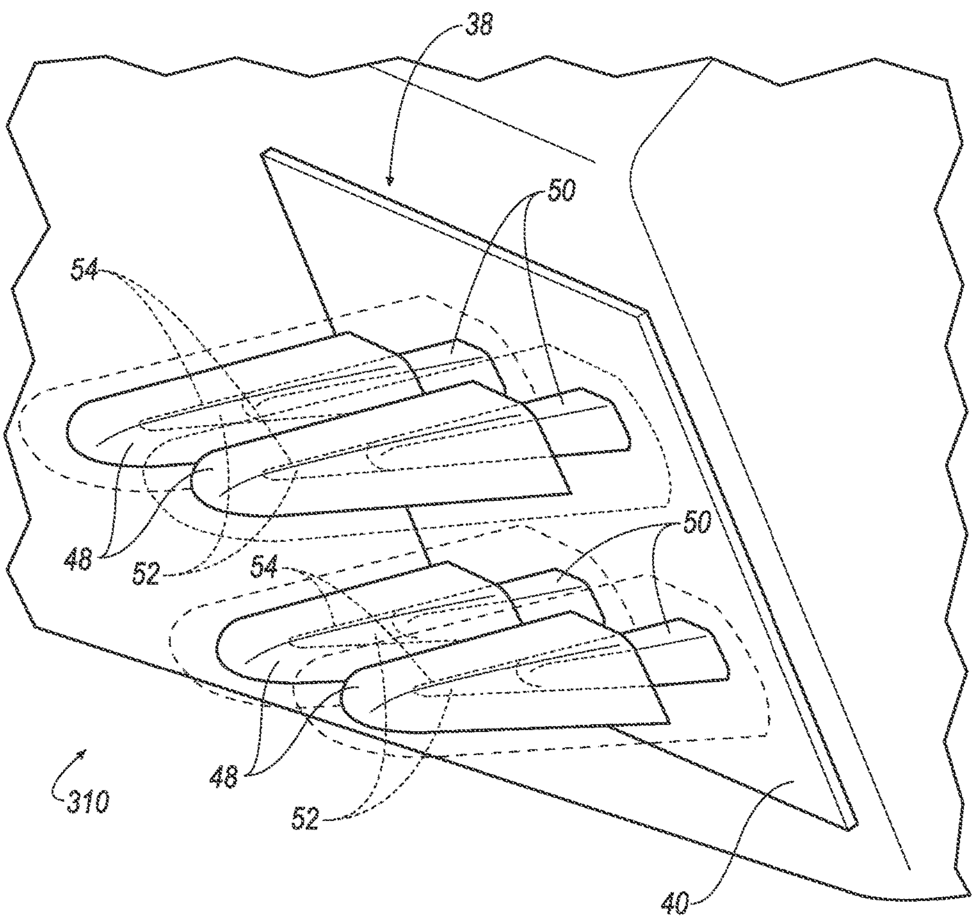
FIG. 8 is a perspective view of another embodiment of the energy absorbing element.

With reference to FIG. 8, the third embodiment of the energy absorbing element 310 may include a receptacle 48 and a plunger 50. The receptacle 48 may define a cavity 52 and the plunger 50 may present a tapered surface 54 that is disposed in the cavity 52. In this configuration, upon application of sufficient force, the plunger 50 is forced into the cavity 52 to deform the receptacle 48 and/or the plunger 50. This deformation of the receptacle 48 and/or the plunger 50 may absorb energy.

The receptacle 48 and the plunger 50 may be formed of any suitable material. For example, the receptacle 48 and the plunger 50 may be formed of the same material or may be formed of different material. The plunger 50 may be rigid relative to the receptacle 48. As one example, the plunger 50 may be formed from a polymer, e.g., plastic or rubber, and the receptacle 48 may be formed of metal, e.g., steel or aluminum. However, the receptacle 48 and plunger 50 may be of any suitable material.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An instrument panel assembly comprising:

an instrument panel;

an energy absorbing element supported by the instrument panel and including a wall;

a first projection and a second projection each disposed between the wall and the instrument panel, the first and second projections extending in a common direction, the first projection being above the second projection; and the first projection having a first density and the second projection having a second density different than the first density.

2. The instrument panel assembly as set forth in claim 1 further comprising a base connected to the first and second projections and connected to the wall.

3. The instrument panel assembly as set forth in claim 2 wherein the base is adhered to the wall.

4. The instrument panel assembly as set forth in claim 2 wherein the first and second projections are cantilevered from the base.

5. The instrument panel assembly as set forth in claim 2 wherein the first and second projections are integrally formed with the base.

6. The instrument panel assembly as set forth in claim 1 wherein the first projection includes a receptacle and a plunger, the receptacle defining a cavity and the plunger presenting a tapered surface disposed in the cavity.

7. The instrument panel assembly as set forth in claim 1 wherein the first projection is formed of a first material and the second projection is formed of a second material different than the first material.

8. An instrument panel assembly comprising:

an instrument panel;

an energy absorbing element supported by the instrument panel and including a wall;

a first projection and a second projection each disposed between the wall and the instrument panel, the first and second projections extending in a common direction, the first projection being above the second projection;

the first and second projections being of a different material than a material of the wall;

the first projection has a first density and the second projection has a second density different than the first density; and a base connected to the first and second projections and connected to the wall, wherein the base is between the wall and the first and second projections.

9. The instrument panel assembly as set forth in claim 8 further comprising a housing defining a chamber and a cover supported by the housing and covering the chamber, wherein the wall is a part of the housing.

10. The instrument panel assembly as set forth in claim 8 wherein the base is adhered to the wall.

11. The instrument panel assembly as set forth in claim 8 wherein the first and second projections are cantilevered from the base.

12. The instrument panel assembly as set forth in claim 8 wherein the first and second projections are integrally formed with the base.

13. The instrument panel assembly as set forth in claim 8 wherein the first projection has a first length and the second projection has a second length different than the first length.

14. The instrument panel assembly as set forth in claim 13 wherein the first projection and the second projection are designed such that the first projection, and not the second projection, contacts the instrument panel and deforms upon application of a first amount of force to the energy absorbing element, and such that the first projection and the second projection contact the instrument panel and deform upon application of a second amount of force to the energy absorbing element, the second amount of force being greater than the first amount of force.

15. The instrument panel assembly as set forth in claim 14, wherein the first amount of force is based on a 5th percentile female, and the second amount of force is based on 95th percentile male.

16. The instrument panel assembly as set forth in claim 8 wherein the first projection extends along an axis and includes ribs spaced from each other along the axis.

17. The instrument panel assembly as set forth in claim 8 wherein the first projection includes a receptacle and a plunger, the receptacle defining a cavity and the plunger presenting a tapered surface disposed in the cavity.

18. The instrument panel as set forth in claim 8 wherein the first projection has a first material and the second projection has a second material different than the first material.

* * * * *